United States Patent
Ikeda et al.

(10) Patent No.: US 6,515,769 B1
(45) Date of Patent: Feb. 4, 2003

(54) IMAGE FORMING APPARATUS AND METHOD

(75) Inventors: Yuichi Ikeda, Tokyo (JP); Nobuatsu Sasanuma, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/803,105

(22) Filed: Feb. 20, 1997

Related U.S. Application Data

(63) Continuation of application No. 08/327,369, filed on Oct. 21, 1994, now abandoned.

(30) Foreign Application Priority Data

Oct. 29, 1993 (JP) ............................... 5-272715
Dec. 29, 1993 (JP) ............................... 5-354529

(51) Int. Cl.⁷ .................... G06F 15/00; G06K 9/36
(52) U.S. Cl. .................... 358/3.1; 358/3.6; 382/289
(58) Field of Search .................... 358/3.06, 3.1, 358/1.9, 534, 536, 448, 447; 382/181, 216, 287, 289

(56) References Cited

U.S. PATENT DOCUMENTS

| | | | |
|---|---|---|---|
| 4,653,111 A | 3/1987 | Mita et al. ............ 382/69 |
| 4,788,426 A * | 11/1988 | Kuehnle ............ 358/400 |
| 4,888,636 A | 12/1989 | Abe ............ 358/80 |
| 5,021,876 A | 6/1991 | Kurita et al. ............ 358/75 |
| 5,031,034 A | 7/1991 | Shimizu et al. ............ 358/79 |
| 5,032,928 A | 7/1991 | Sakai et al. ............ 358/448 |
| 5,038,208 A * | 8/1991 | Ichikawa et al. ............ 358/75 IJ |
| 5,105,280 A * | 4/1992 | Ogino et al. ............ 358/298 |
| 5,132,788 A * | 7/1992 | Hirota ............ 358/75 |
| 5,142,356 A | 8/1992 | Usami et al. ............ 358/80 |
| 5,155,586 A * | 10/1992 | Levy et al. ............ 358/54 |
| 5,166,786 A | 11/1992 | Sakai et al. ............ 358/76 |
| 5,187,593 A | 2/1993 | Kurita et al. ............ 358/434 |
| 5,204,759 A | 4/1993 | Sakai et al. ............ 358/444 |
| 5,222,154 A * | 6/1993 | Graham et al. ............ 358/522 |
| 5,258,783 A | 11/1993 | Sasanuma et al. ............ 346/147 |
| 5,355,420 A * | 10/1994 | Bloomberg ............ 382/46 |
| 5,410,414 A * | 4/1995 | Curry ............ 358/298 |
| 5,483,606 A * | 1/1996 | Denber ............ 382/294 |
| 5,485,289 A * | 1/1996 | Curry ............ 358/448 |

* cited by examiner

Primary Examiner—Madeleine Nguyen
(74) Attorney, Agent, or Firm—Fitzpatrick, Cella, Harper & Scinto

(57) ABSTRACT

An image forming apparatus and method in which, when a recording medium on which a gray-scale pattern has been formed is placed upon a platen in a skewed attitude, the resulting offset is corrected and image forming conditions are adjusted to obtain an ideal image. In one one such apparatus, a 256-tone pattern image of a designated color is formed on a recording medium. If the recording medium has been placed upon a platen in a skewed attitude when the pattern is to be read, the position of the pattern image is corrected, the gamma characteristics of a LUT are calculated based upon the correct pattern image and the calculated values for the LUT are set.

24 Claims, 19 Drawing Sheets

IMAGE FORMING APPARATUS AND METHOD

This application is a continuation continuation of application Ser. No. 08/327,369 filed Oct. 21, 1994, now abandoned.

BACKGROUND OF THE INVENTION

This invention relates to an image forming apparatus and method for forming a monochromatic or color image a recording medium.

In an image forming method according to the prior art, a technique is known in which the stability of image quality is improved by forming one specific pattern on a recording medium, reading the intensity of the pattern of the recorded image and feeding the read intensity back to control image forming conditions such a γ correction. This technique makes it possible to stabilize image quality in conformity with an amount of fluctuation in characteristics due to long use and an amount of fluctuation in environmental conditions.

With the example of the prior art described above, however, any skewing or deviating of the recording medium when the recording medium having a gray-scale pattern (intensity data) is placed upon a platen and read can result in the wrong data being read in. When feedback to the image forming conditions is performed using this data, an optimum image cannot be obtained.

Furthermore, in the above-described example of the prior art, there are instances in which an abnormally sudden fluctuation in intensity occurs owing to an abnormality in the image forming apparatus despite the fact that a uniform intensity is outputted over the full surface of the recording medium in the image forming apparatus. When feedback to the image forming conditions is performed using this data, the optimum image cannot be obtained.

SUMMARY OF THE INVENTION

An object of the present invention is to provide an image forming apparatus and method in which an image forming condition is properly controlled. For example, an object of the present invention is to provide an image forming apparatus and method in which, when a recording medium on which a gray-scale pattern has been formed is placed upon a platen in a skewed attitude, the offset is corrected and the image forming conditions are adjusted, whereby an ideal image is obtained.

Another object of the present invention is to provide an image forming apparatus and method in which, if an abnormal portion is found in an intensity value of a gray-scale test pattern when the pattern is read in, notification is given of the fact that some abnormality has developed, thereby making it possible to prevent an erroneous operation, and in which maintenance is facilitated by estimating the location at which an abnormality has occurred.

According to the present invention, the foregoing objects are attained by providing an image forming apparatus for forming an image on a recording medium, comprising pattern forming means for forming at least one-gray-scale pattern on a recording medium, correcting means for correcting positional deviation of the gray-scale pattern, which is formed by the pattern forming means and controlling means for controlling an image forming condition on the basis of the gray-scale pattern whose position has been corrected by the correcting means.

Further, the foregoing objects are attained by providing an image forming method for forming an image on a recording medium, comprising the steps of forming at least one gray-scale pattern on a recording medium, correcting positional deviation of the gray-scale pattern, which is formed at the forming step and controlling an image forming condition on the basis of the gray-scale pattern whose position has been corrected at the correcting step.

In another aspect of the invention, the foregoing objects are attained by providing an image forming apparatus comprising image forming means for forming an image, pattern forming means for forming a specific gray-scale pattern, reading means for reading the gray-scale pattern formed by the pattern forming means and generating image data, controlling means for controlling an image forming condition on the basis of the image data, and discriminating means for discriminating whether the image data generated by the reading means is suitable for being used by the controlling means.

Further, the foregoing objects are attained by providing an image forming apparatus comprising reading means for reading an image formed on a medium and generating image data, pattern generating means for generating pattern data representing a gray-scale pattern and a standard point, image forming means for forming an image on a medium in accordance with the image data or the pattern data, and controlling means for controlling an image forming condition of the image forming means based on a gray-scale pattern formed on a medium and read by the reading means, wherein the controlling means includes discriminating means for discriminating a standard point formed on the medium and read by the reading means.

Other features and advantages of the present invention will be apparent from the following description taken in conjunction with the accompanying drawings, in which like reference characters designate the same or similar parts in the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE PREFERRED EMBODIMENTS

Preferred embodiments of the present invention will now be described in detail with reference to the accompanying drawings.

Figure 1:
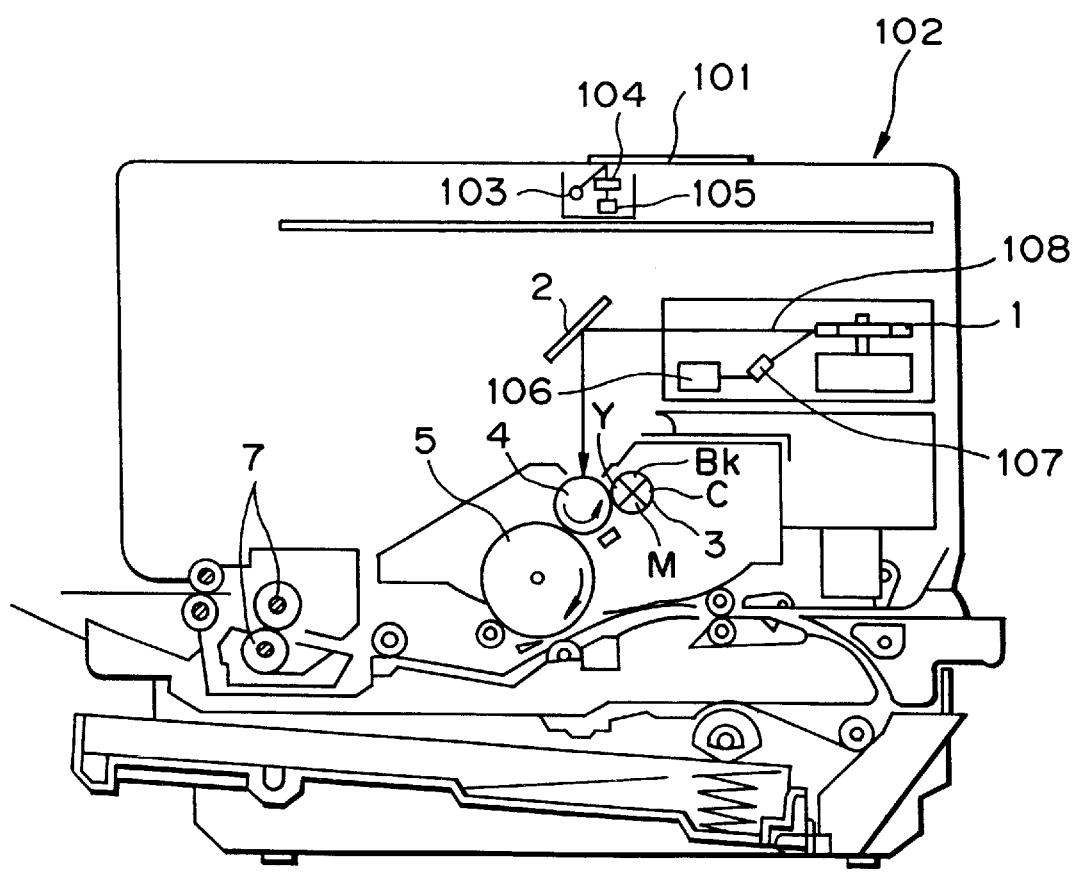
FIG. 1 is a diagram showing the construction of a full-color digital copier according to an embodiment of the present invention.

FIG. 1 is a diagram showing the construction of a color digital copier according to an embodiment of the present invention. The copier includes a platen 102 on which an output sample 101 is placed. The sample 101 is illuminated by a light source 103, the reflected light from the sample 101 impinges upon a CCD 105 upon passing through a lens 104 in an optical system, and the CCD 105 converts the incident light into a signal representing the amount of reflected light. The signal resulting from the conversion is converted to a laser beam 108 via a laser driver 106 and a semiconductor laser 107, and the laser beam 108 is reflected by a polygon mirror 1 and a mirror 2 so as to irradiate a photosensitive drum 4. The photosensitive drum 4, on which a latent image is formed by scanning of the laser beam 108, is rotated in the direction of the arrow in FIG. 1 so that an image is developed for each color by means of a rotary developing device 3. (FIG. 1 illustrates the moment at which development is being carried out using yellow toner.)

Meanwhile, recording paper is taken up by a transfer drum 5. One color is transferred to the recording paper on the drum 5 per revolution of the drum. Colors are transferred in the order Y, (yellow), M (magenta), C (cyan), Bk (black) in a total of four revolutions of the drum 4, whereby transfer is completed.

At the end of the transfer operation, the recording paper is peeled off the transfer drum 5 and the image is fixed by a pair of fixing rollers 7 to complete the printing of a color image.

Figure 2:
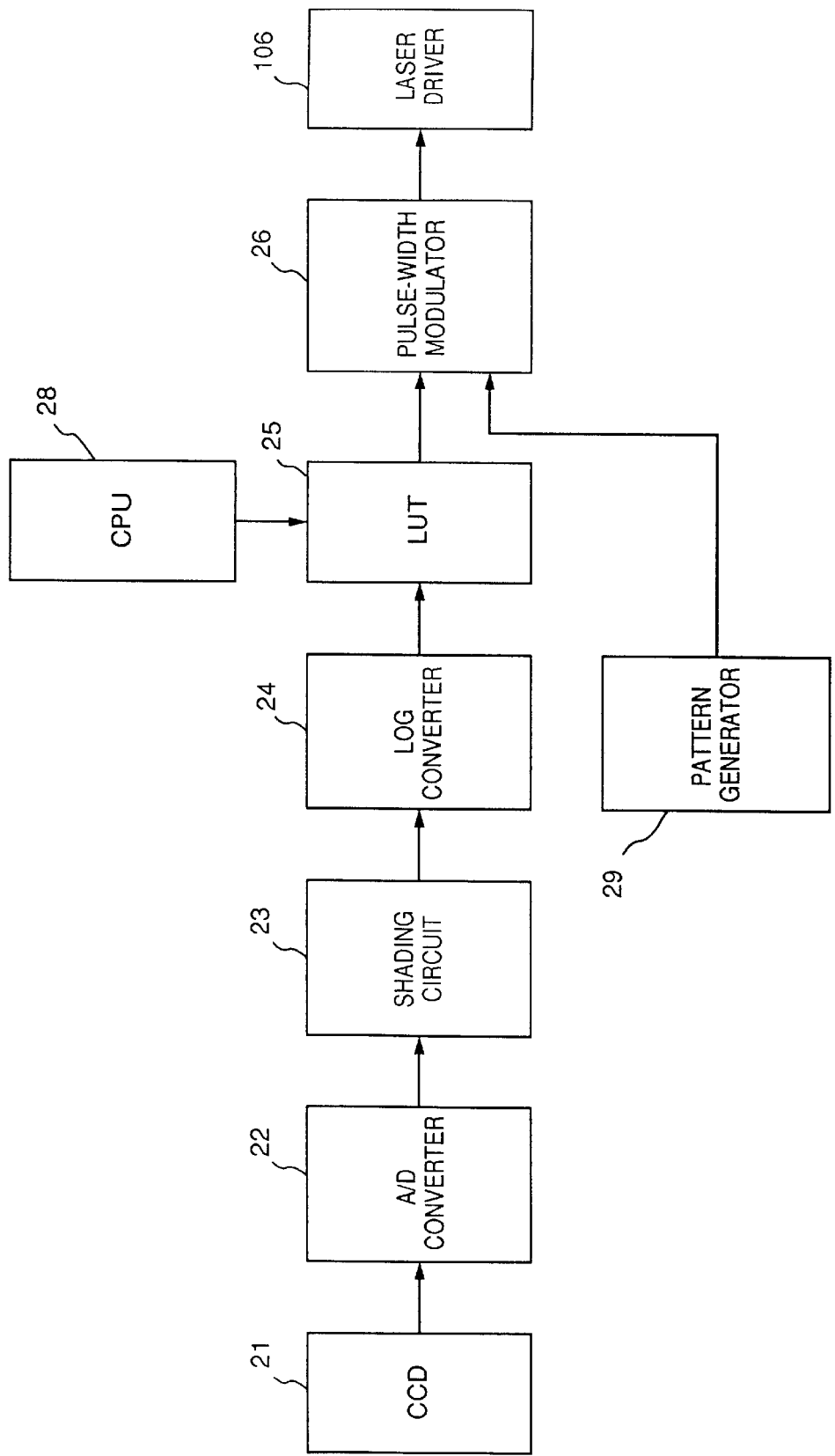
FIG. 2 is a block diagram showing a processing circuit for processing an electric signal from a CCD.

FIG. 2 is a diagram illustrating an image signal processing circuit for obtaining a gray-scale image according to this embodiment.

First, an analog luminance signal representing the image is obtained by a CCD 21, and the analog luminance signal is converted to a digital intensity signal by an A/D converter 22. A disparity in the sensitivity of the individual CCD elements constituting the CCD 21 is corrected by a shading circuit 23 on the basis of the obtained intensity signal, and the corrected signal is converted to an intensity signal for a printer by a LOG converter 24. The intensity signal resulting from the conversion is applied to a LUT 25, which compensates for non-linearity of the γ characteristic of the printer at the time of an initial setting and effects a conversion to achieve agreement with the intensity of the original image.

The manner in which grays are reproduced will now be described with reference to a four-quadrant graph shown in FIG. 3.

Figure 3:
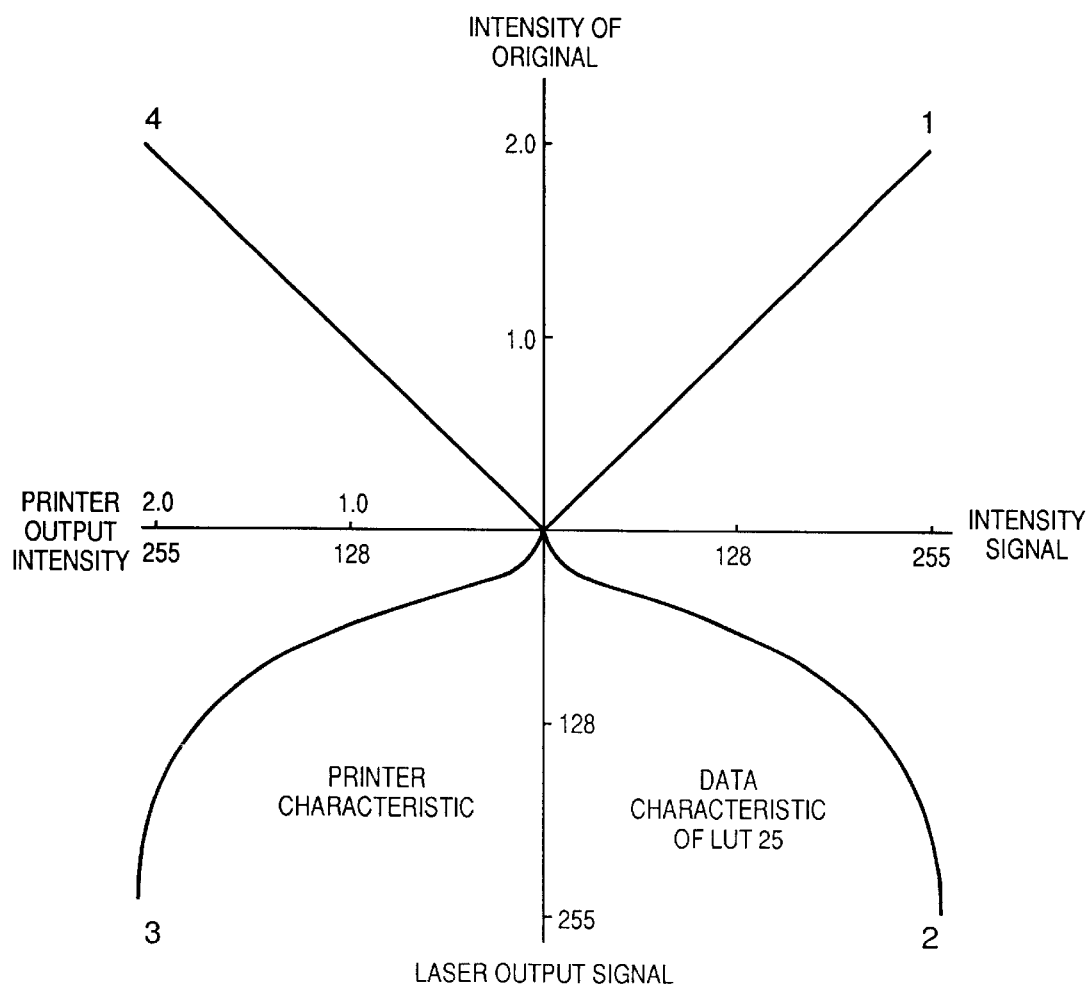
FIG. 3 is a four-quadrant graph showing a tone reproducibility characteristic.

As shown in FIG. 3, the first quadrant indicates the characteristics of a reader which converts intensity of an original to an intensity signal, the second quadrant a data characteristic of the LUT 25 for converting the intensity signal to a laser output signal, the third quadrant the characteristic of a printer for converting the laser output signal to output intensity, and the fourth quadrant the overall gray-scale characteristic of the image forming apparatus. This characteristic of the fourth quadrant indicates the relationship between printer output intensity and intensity of the original. Since the digital image signal is composed of eight bits, the number of grays (color tones) is 256.

In this example, the curved part of the printer characteristic in the third quadrant is corrected by the LUT 25 of the second quadrant in order to linearize the gray-scale characteristic in the fourth quadrant.

After the conversion is performed by the LUT 25, the signal is converted to a signal corresponding to dot width by a pulse-width modulator 26, shown in FIG. 2. The resulting signal is sent to a laser driver 106.

According to this embodiment, tone reproducing means which relies upon pulse-width modulation processing is used. A latent image having a gray-scale characteristic owing to a change in dot area is formed on the photosensitive drum 4 by laser-beam scanning, and a gray-scale image is formed through the process of development, transfer and fixing.

The apparatus of this embodiment internally incorporates a test-pattern generator for outputting a test pattern onto the photosensitive drum 4.

The toners used in this embodiment are toners of the colors yellow, magenta and cyan. The toners contain a styrene copolymer resin as a binder, and each toner is formed by dispersing a colorant in the binder.

<First Embodiment>

Figure 4:
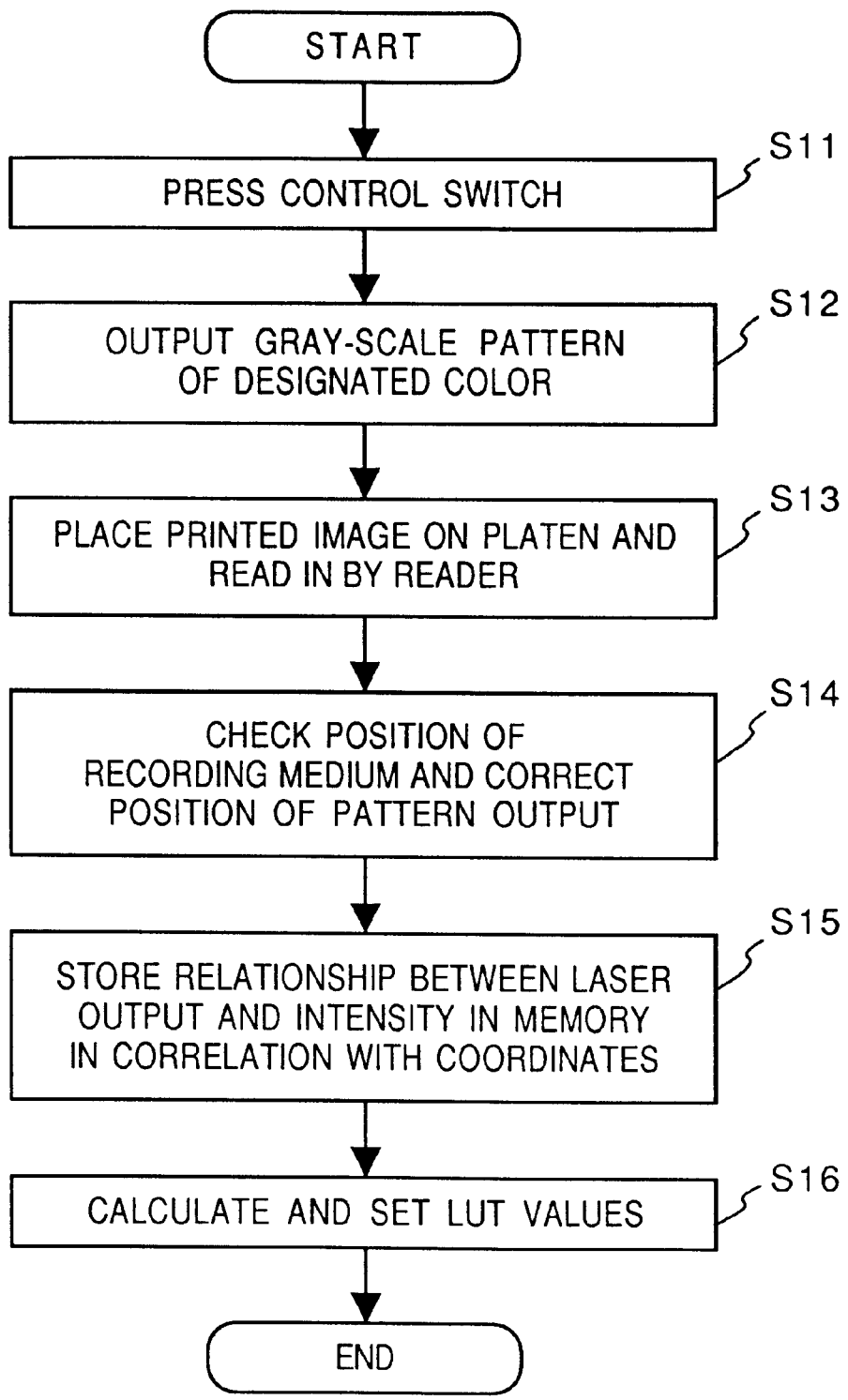
FIG. 4 is a flowchart showing processing according to a first embodiment of the invention.

Next, image processing according to a first embodiment will be described in accordance with the flowchart shown in FIG. 4.

Figure 5:
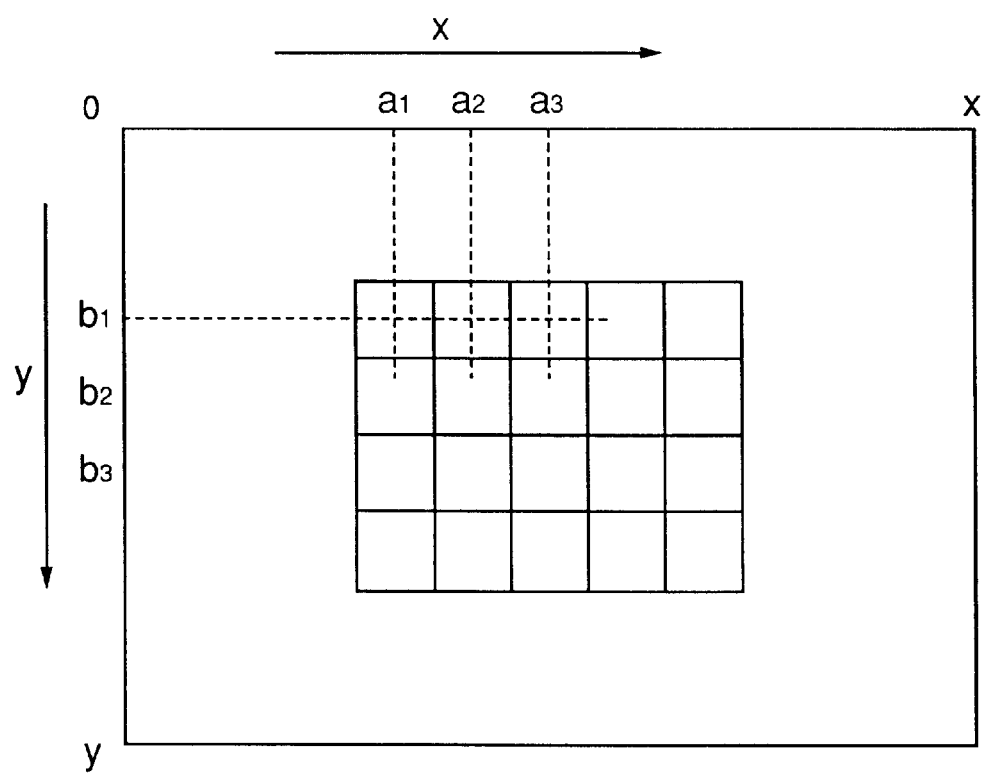
FIG. 5 is a diagram showing an example of a printed output in the first embodiment.

First, at step S11, using a control panel (not shown) on the color copier of this embodiment, the operator designates which color has been judged to have an abnormal gray-scale characteristic and presses a control-start switch (not shown), whereupon the program proceeds to step S12. Here a 256-tone pattern image of the designated color is formed on the recording medium by the internal pattern generator 29, as shown in FIG. 5, and the pattern is printed. As illustrated in FIG. 5, the pattern has a horizontal axis x and a vertical axis y, with the origin being located at the upper left corner. The edges of the recording medium are located at coordinates (x,0), (0,y), and the positions of patches are represented by coordinates (a1,b1), (a2,b2), . . .

Figure 6:
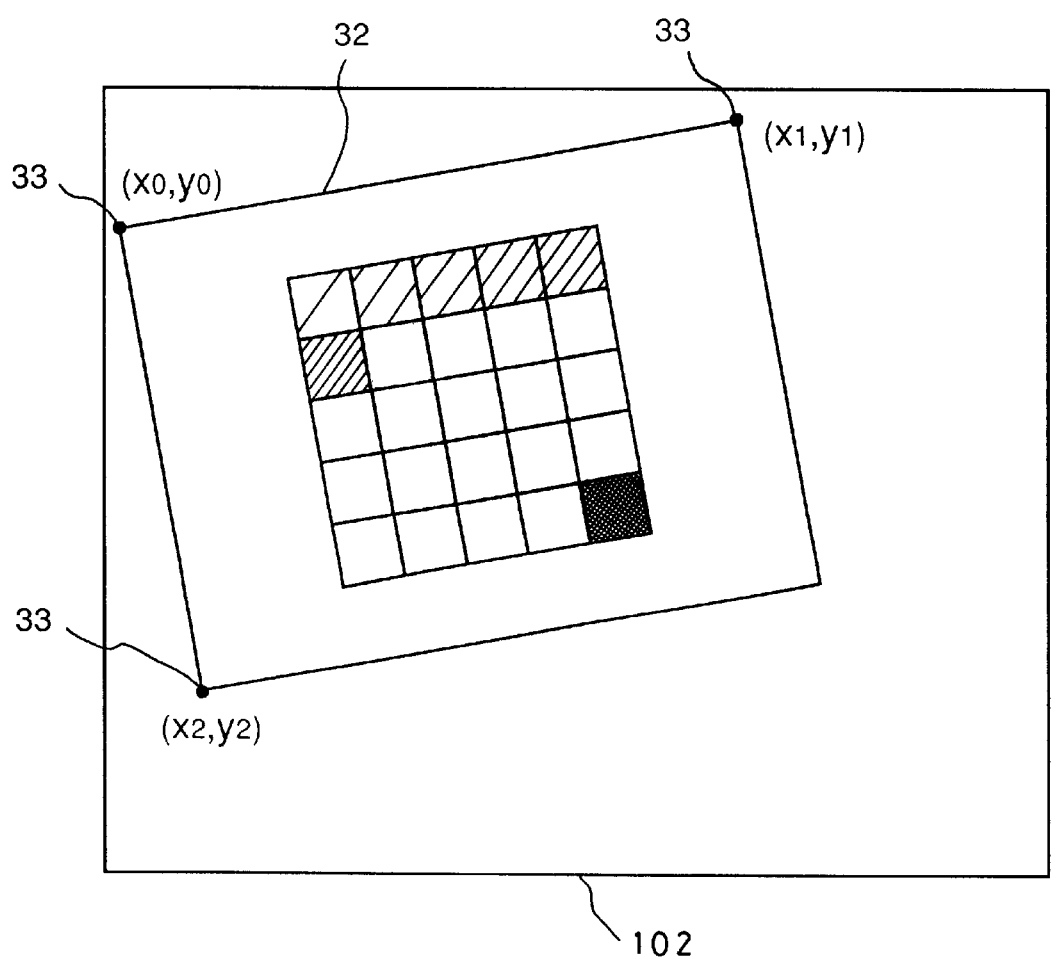
FIG. 6 is a diagram for describing processing in the first embodiment.

Next, at step S13, the printed sample 101 is placed upon the platen 102 of the reader, whereupon the sample is illuminated by a light source 103. The reflected light from the sample passes through the color-separating optical system 104 and is converted into a signal, which represents the amount of reflected light, by the CCD 105. This signal is read in by the reader. If a recording medium 32 is placed upon a platen 102 in a skewed attitude, as shown in FIG. 6, the position of the pattern output is corrected at step S14. More specifically, at scanning time a signal indicative of reflection produced when the recording medium 32 is placed upon the platen differs from that when the recording medium is not placed upon the platen. As a result, each of the corners 33 of the recording medium 32 can be sensed. Let each coordinate of the corners 33 of the recording medium 32 relative to the platen 102 be represented by (x0,y0), (x1,y1), x2,y2), by way of example. The coordinates of the aforementioned patches can therefore be expressed by $$[a1(x1-x0)/x+b1(x2-x0)/x+x0, a1(y1-y0)/y+b1(y2-y0)y+y0],$$
$$[a2(x1-x0)/x+b1(x2-x0)/x+x0, a2(y1-y0)/y+b1(y2-y0)y+y0], \ldots$$

Here (x,y) indicates the patch position of a recording medium placed upon the platen in a skewed attitude.

Next, at step S15, the relationship between laser output and intensity, namely the pattern image of the 256 gray levels, is read in a memory in correlation with the above-mentioned position coordinate information. A region, which is read by reading means, in a patch is smaller than a circle whose radius is $a/2\sqrt{2}$ (a: length of a side of the patch). This makes it possible to keep the region of measurement within a patch on the condition that a center of measurement has a correct coordinate, even if the sample image is put on the platen 102 on a slant. It is known generally that excellent measurement reproducibility is obtained in an optical system using a CCD by performing shading correction. Next, at step S16, the set values of the LUT are calculated on the basis of the printer characteristic, shown in FIG. 3, using the intensity data of the 256 gray levels. The calculated values are then set in the LUT. In order to improve the gray-scale characteristic, the amount of laser light, laser emission time, the voltage of a primary charger device and development bias, etc., should be adjusted.

By virtue of the adjustment mentioned above, erroneous reading of intensity data will not occur even if the recording medium 32 is not placed upon the platen 102 in a correctly aligned manner. This makes it possible to form an image exhibiting excellent tonality.

<Modification of First Embodiment>

In the first embodiment, the edges of the recording medium are sensed and displacement of the recording medium is corrected. However, it is also possible to record data points on the recording medium and decide the position of the pattern image using these points as positional references.

Figure 7:
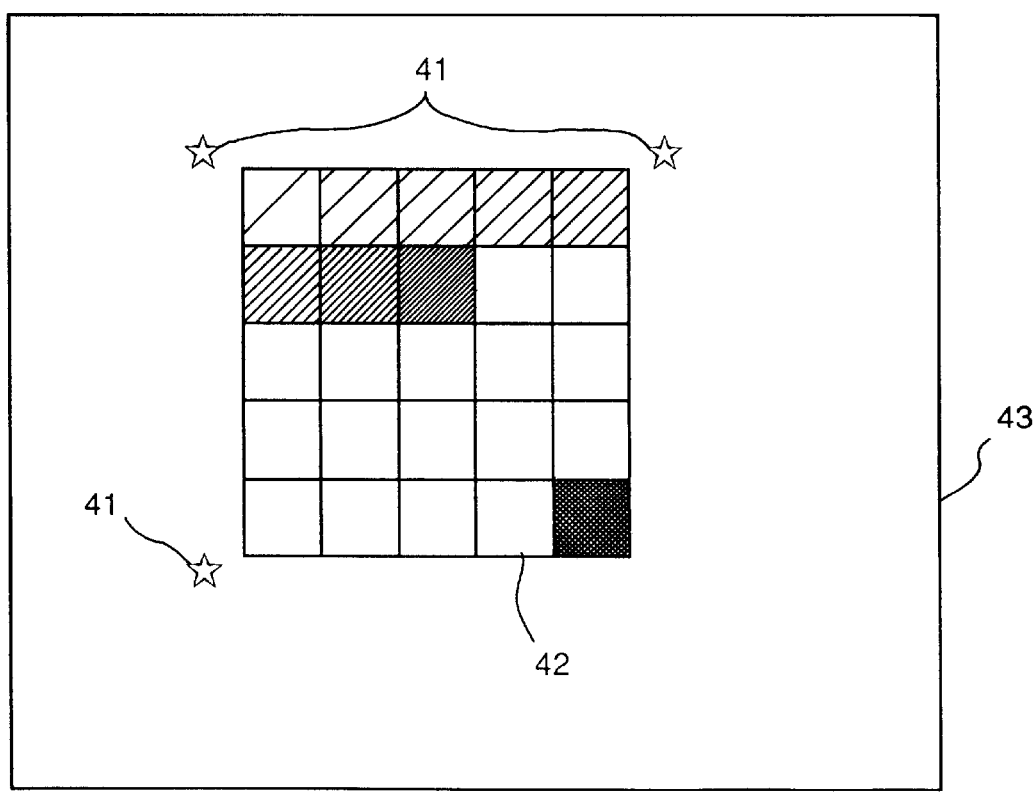
FIG. 7 is a diagram showing an example of a printed output in a modification of the first embodiment.

By way of example, as shown in FIG. 7, data points 41 (two or more; three in this modification) and a pattern image 42 of 256 tones of a designated color are formed on a recording medium 43 and the pattern is printed out. It is desired that the data points be of different colors in order that they can be recognized. For example, if the pattern is black, the three data points are recorded as the colors magenta, cyan and yellow.

Figure 8:
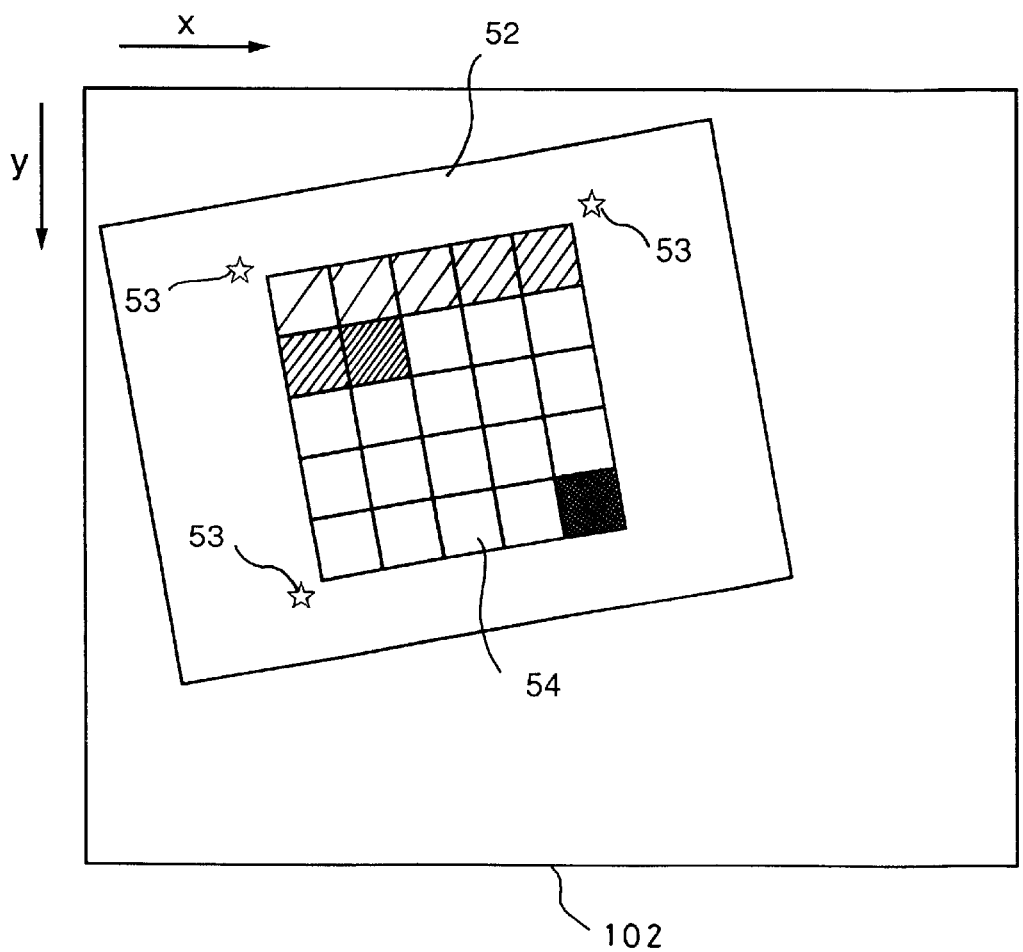
FIG. 8 is a diagram for describing processing in a modification of the first embodiment.

If, as in the first embodiment, a recording medium 52 on which a pattern image 54 has been printed is placed upon a platen 102 in a skewed attitude, as shown in FIG. 8, each coordinate of data points 53 of the recording medium 52 relative to the platen 102 are read in when the image is read. Though the edges of the recording medium are used in the first embodiment, here a similar operation is performed using the data points. That is, since the position of the pattern image 54 relative to the data points 53 has been determined, the position of the pattern image 54 can be determined if the positions of the data points 53 are determined.

Figure 9:
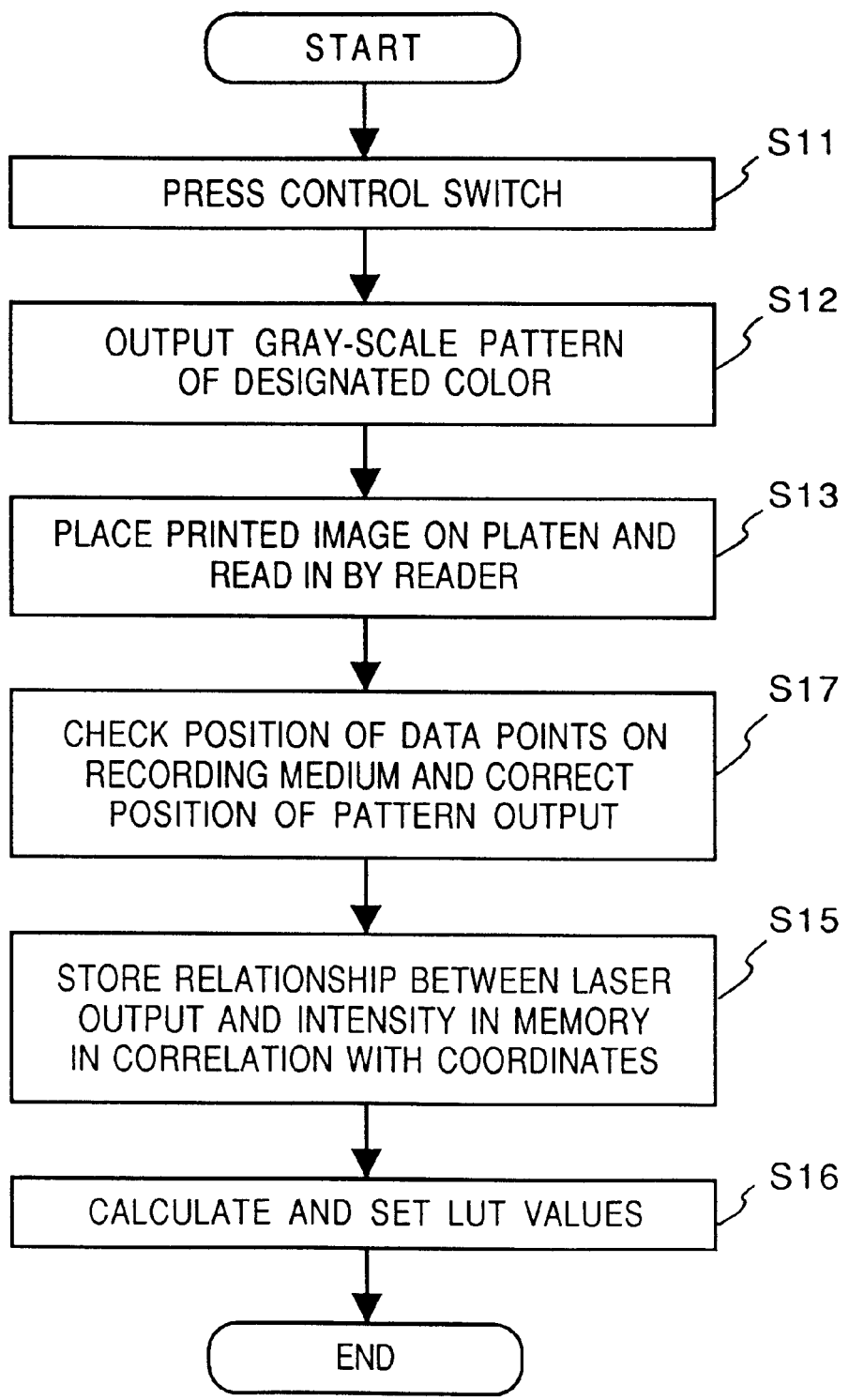
FIG. 9 is a flowchart illustrating processing in a modification of the first embodiment.

FIG. 9 is a flowchart illustrating the processing procedure according to this modification. Processing steps similar to those of the first embodiment are designated by like step numbers and need not be described again. As shown in FIG. 9, step S17 replaces step S14 in FIG. 4. According to step S17 of this modification, the positions of the data points on the recording medium are confirmed and the position of the pattern output is corrected accordingly.

Thus, as in the first embodiment, the pattern image can be read correctly even if the recording medium is skewed.

<Second Embodiment>

In the embodiment described above, control is performed on the basis of a single designated color. However, conversion-table mismatch due to a change with the passage of time or a change in environment can naturally occur in all types of color toners used. In the second embodiment, therefore, a correction is applied at one time for all of the colors, namely yellow, magenta, cyan and black.

Figure 10:
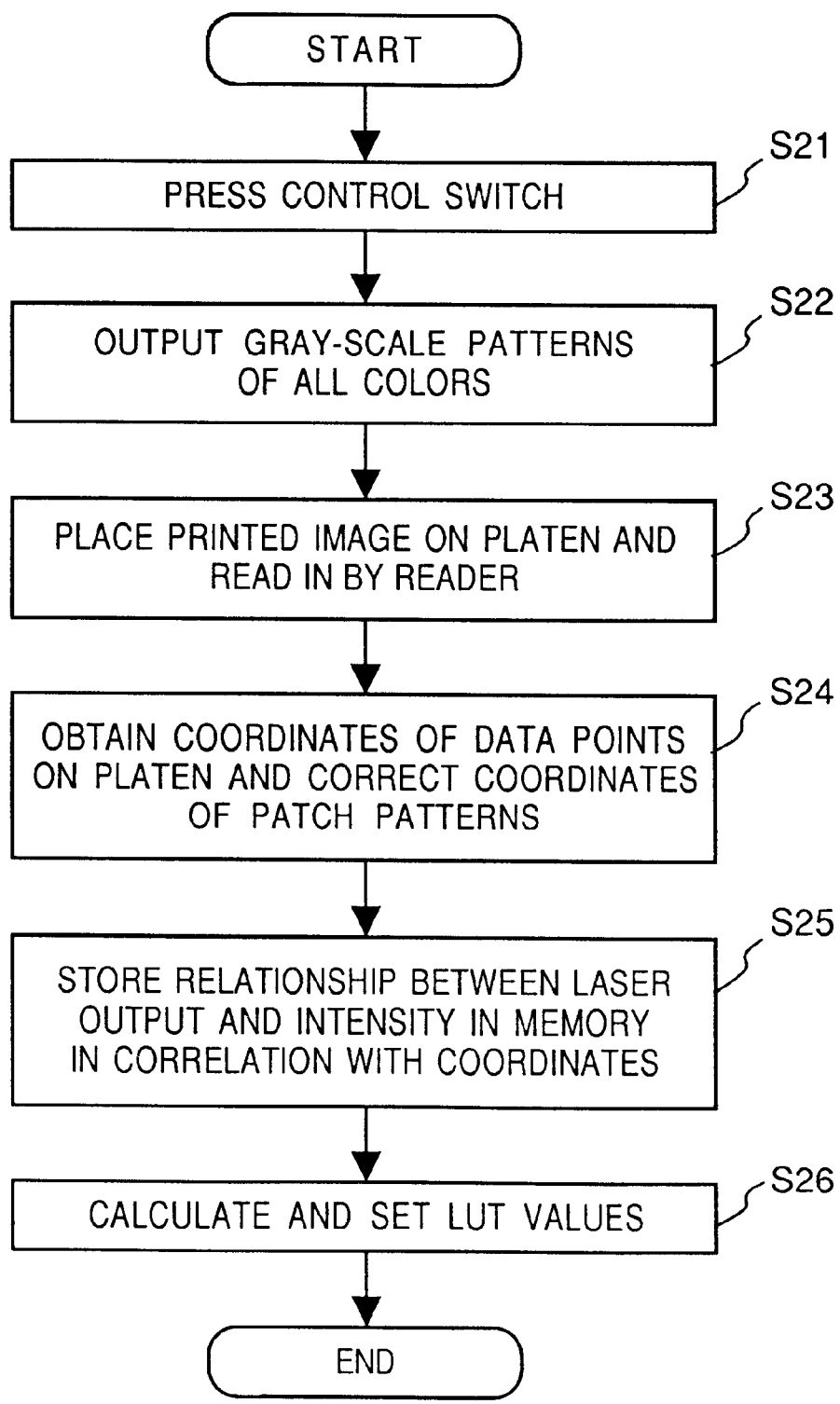
FIG. 10 is a flowchart showing processing according to a second embodiment of the invention.

FIG. 10 is a flowchart illustrating processing according to the second embodiment.

Figure 11:
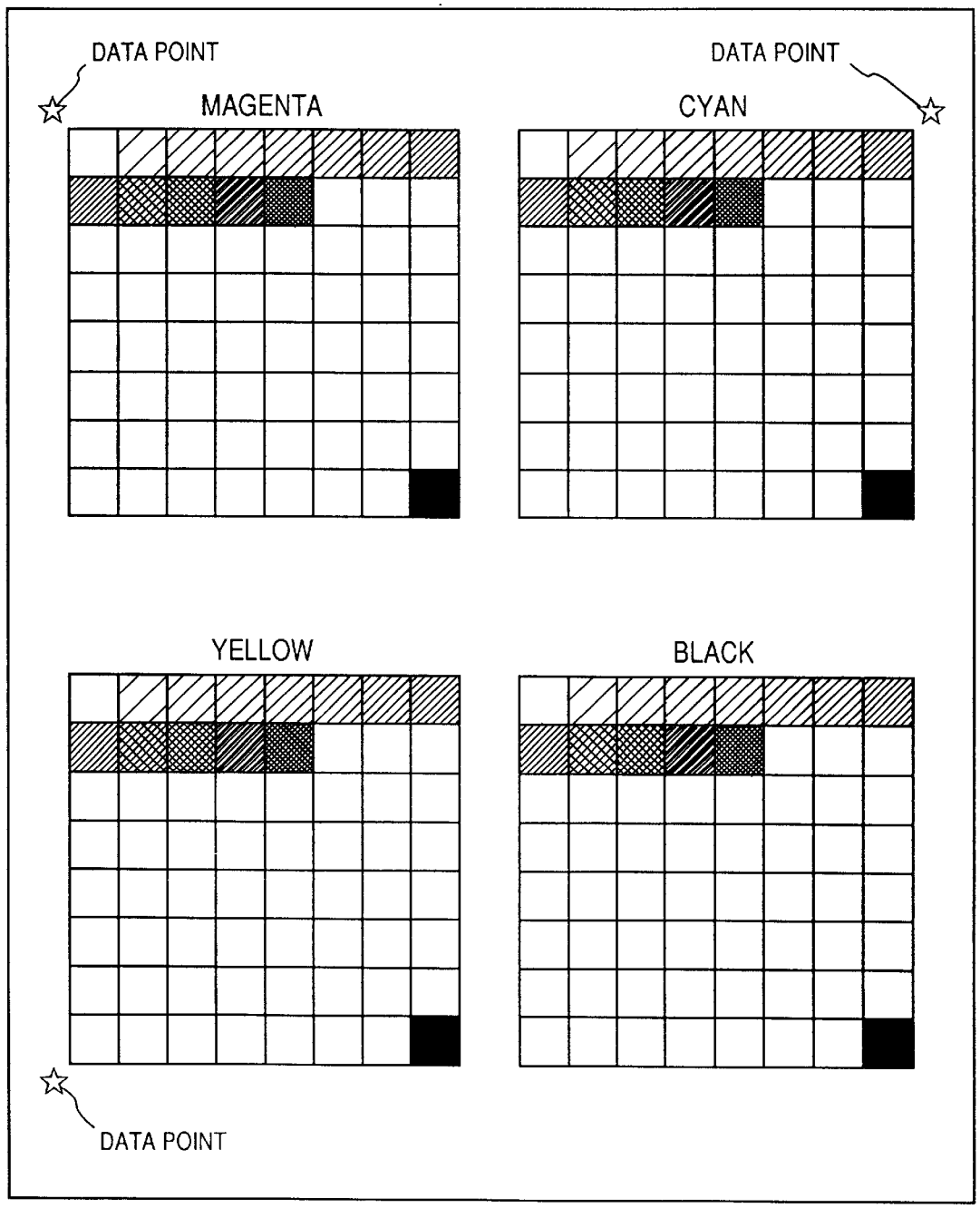
FIG. 11 is a diagram showing an example of a printed output in the second embodiment.

First, at step S21, the operator presses the control-start switch on the control panel, whereupon the program proceeds to step S22. Here the internal pattern generator 29 forms 64-tone pattern images of all colors on the recording medium, as shown in FIG. 11, and prints the pattern images in a manner similar to that of the first embodiment.

Next, at step S23, the printed patterns are placed upon the platen of the reader, whereupon the patterns are read in as in the first embodiment. The coordinates of the data points on the platen are found at step S24 and the coordinates of the patch patterns are corrected. Next, at step S25, the relationship between laser output and intensity is read in a memory in correlation with the above-mentioned position coordinate information, a LUT is calculated using the intensity data at step S26, and the calculated values are set.

With regard to creation of the LUT, a first-order interpolation is performed in order to generate intermediate data from the 64-point data. To raise accuracy, however, a higher order interpolation and a higher order approximation should be carried out.

By virtue of the control described above, erroneous reading of intensity data will not occur even if the recording medium is not placed upon the platen in a correctly aligned manner. This makes it possible to form an image exhibiting excellent tonality.

<First Modification>

Though a full-color digital copier is described in each of the foregoing embodiments, the present invention is effective in a monochromatic digital copier as well.

Figure 12:
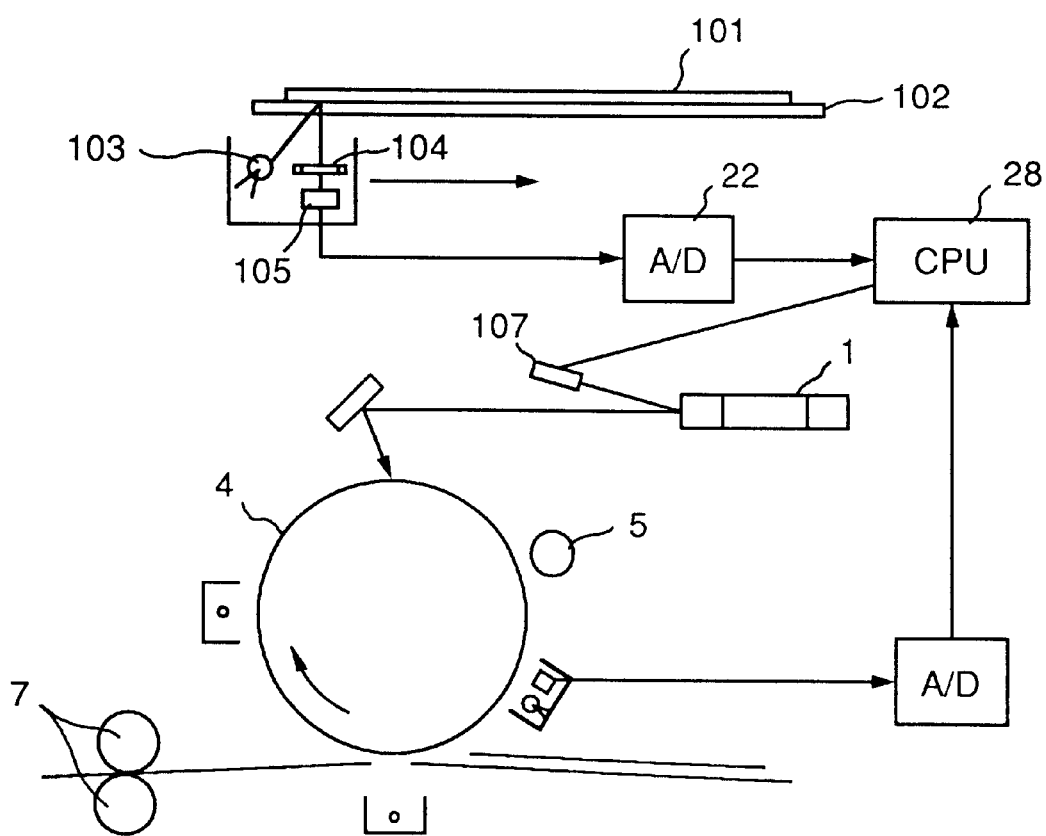
FIG. 12 is a diagram showing the construction of a monochromatic digital copier in a first modification.

FIG. 12 is a diagram illustrating the construction of a monochromatic digital copier. The principal components are numbered to agree with FIG. 1.

Since multiple transfer is not required in a monochromatic copier, the chief difference is that a transfer drum is not provided. Control per se is the same as shown in FIGS. 4 and 5, and need not be described again.

By performing control similar to that of the foregoing embodiments, erroneous reading of intensity data will not occur even if the recording medium 32 is not placed upon the platen 102 in a correctly aligned manner. This makes it possible to form an image exhibiting excellent tonality.

<Second Modification>

In each of the foregoing embodiments, pattern images are entered upon correcting for deviation of the recording medium. However, an arrangement may be adopted in which a message such as "ORIGINAL IS NOT IN CORRECT POSITION. PLEASE RE-POSITION CORRECTLY." is displayed on the control panel in cases where the deviation is very large (as when the recording medium protrudes from the platen) or where there is no correcting means. This makes it possible to control tone after the original has been placed on the platen correctly.

In this case also erroneous reading of intensity data will not occur even if the recording medium is not placed upon the platen in a correctly aligned manner. This makes it possible to form an image exhibiting excellent tonality.

Thus, according to the embodiments as described above, when a recording medium on which a gray-scale pattern has been formed is placed upon a platen in a skewed attitude, the pattern is read in after the positional deviation is corrected and then the image forming conditions are adjusted, thereby making it possible to obtain the optimum image.

<Third Embodiment>

The principal elements of this embodiment of the invention are the same as those described above in connection with FIG. 1.

An image signal processor according to this embodiment will be described with reference to FIG. 13.

An analog luminance signal representing the image of an original is read by a CCD 1021, and the analog luminance signal is converted to a digital intensity signal by an A/D converter 1022. The digital intensity signal is sent to a shading circuit 1023 which corrects for an irregularity in the amount of light caused by a disparity in the sensitivity of the individual CCD elements constituting the CCD 1021. The shading correction improves the measurement reproducibility of the CCD 1021. The intensity signal corrected by the shading circuit 23 is LOG-converted by a LOG converter 1024. Next, the LOG-converted signal is sent to a gamma look-up table ($\gamma$ LUT) 1025. The latter is used to convert the signal to an image signal so as to achieve agreement between the intensity of the original image at the time of the initial setting of the printer and the output image intensity obtained by processing in accordance with the $\gamma$ characteristic.

The image signal resulting from this conversion is subjected to pulse-width conversion by a pulse-width modulator 1026, and the converted signal is fed into a laser driver 1102 to drive a semiconductor laser 107.

Numeral 1028 denotes a CPU, and numeral 1029 represents a pattern generator which generates various gray-scale test patterns, described later. Numeral 1020 designate a control panel used in the procedure described below.

In this embodiment, use is made of tone reproducing means which relies upon pulse-width conversion processing in which the pixels of all colors are arrayed in the main-scan direction, an electrostatic latent image having a gray-scale characteristic owing to a 4 change in dot area is formed on the photosensitive drum by laser-beam scanning, and a gray-scale image is obtained through the process of development, transfer and fixing.

In order to linearize the gray-scale characteristic as illustrated in the fourth quadrant of FIG. 3, distortion of the recording characteristic of the printer shown in the third quadrant is corrected by the $\gamma$-LUT 1025 whose characteristic is shown in the second quadrant.

Since the image signal is processed as an eight-bit digital signal in this embodiment, the number of gray levels is 256.

The process through which the $\gamma$-LUT 1025 is set by the CPU 1028 in this embodiment will be described with reference to FIG. 14.

Figure 13:
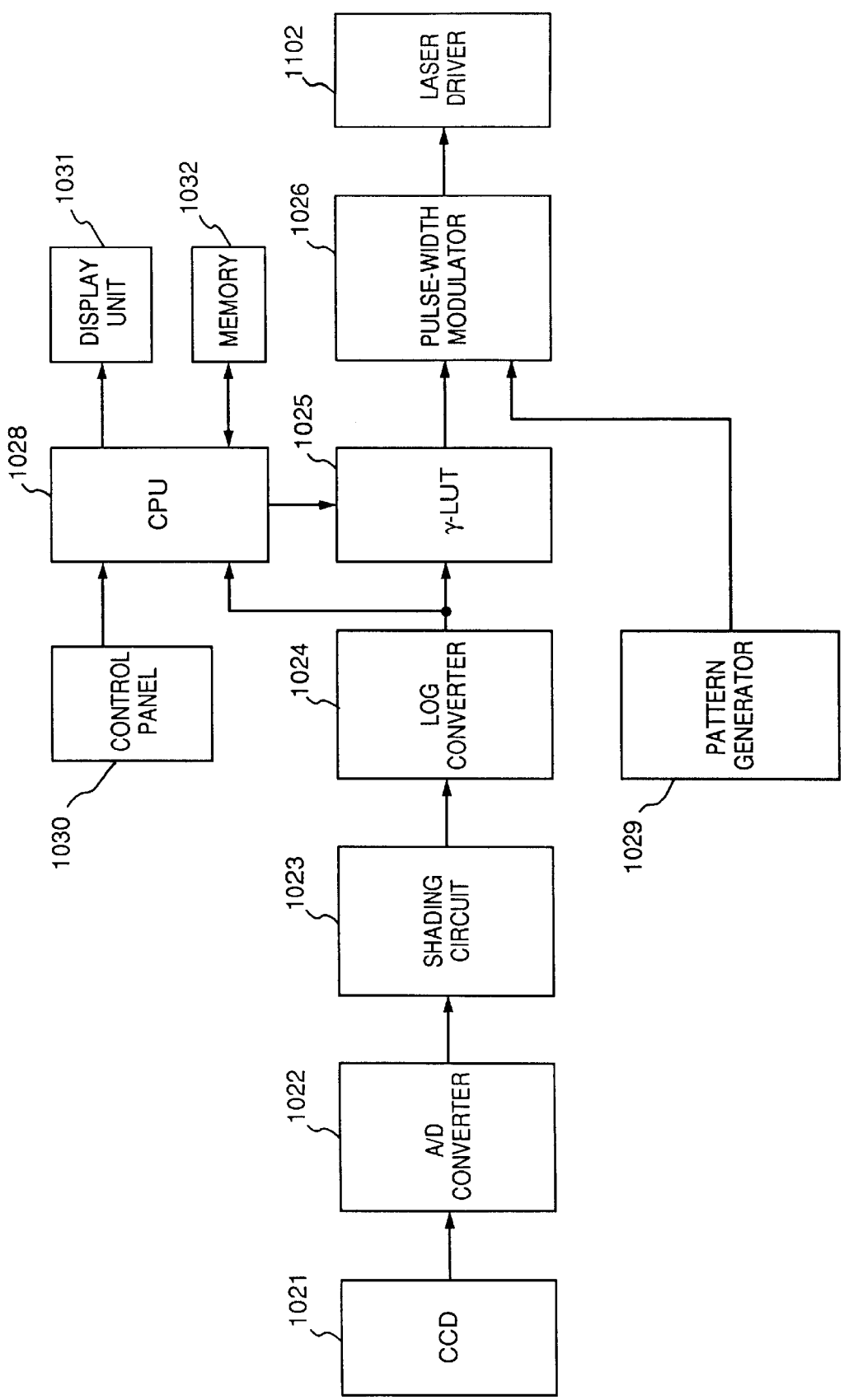
FIG. 13 is a block diagram illustrating in detail the construction of an image signal processor according to another embodiment of the present invention.
Figure 14:
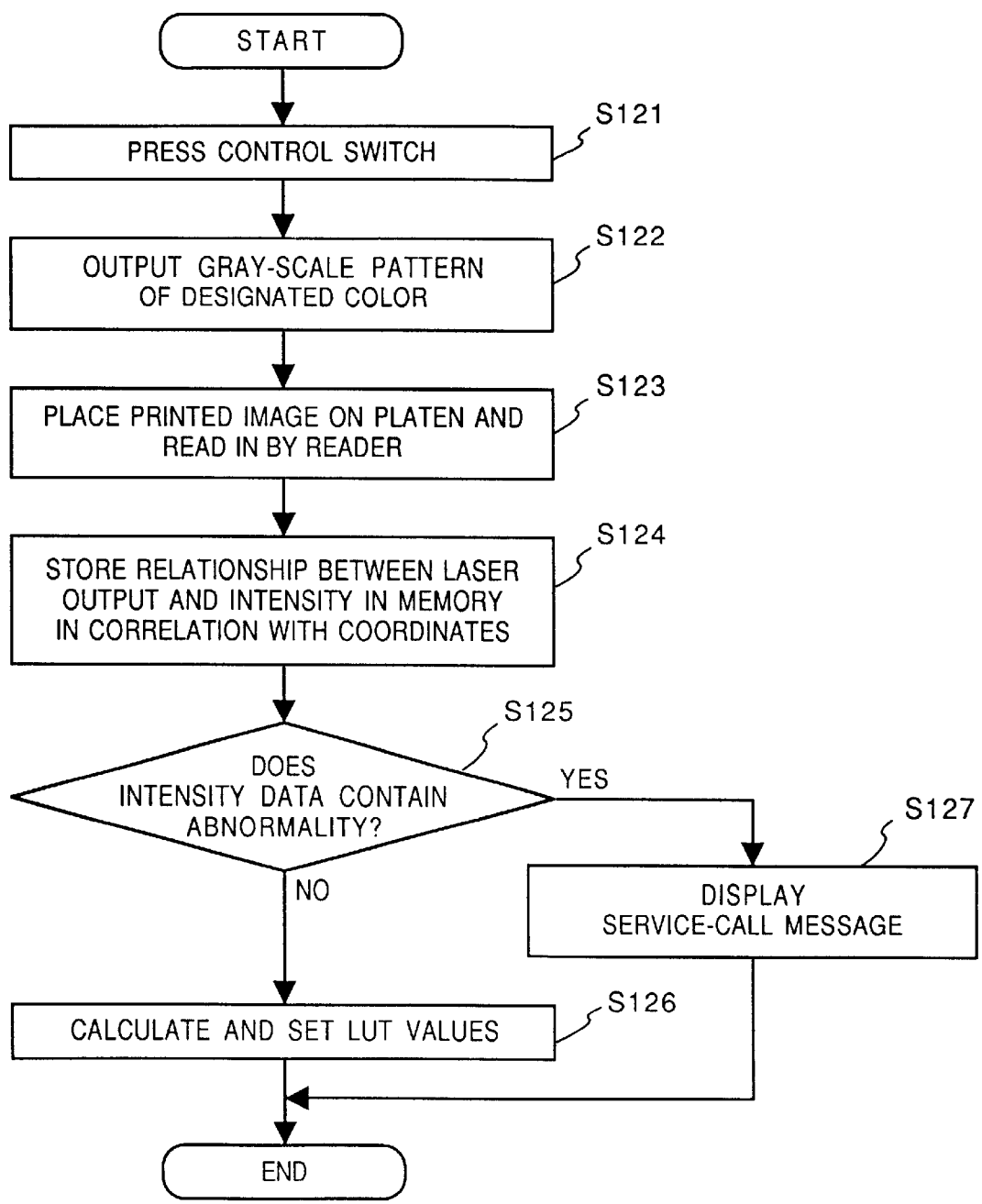
FIG. 14 is a flowchart illustrating processing for creating a gamma LUT in third and fourth embodiments of the present invention.

First, at step S121 in FIG. 14, using the control panel 1030 (FIG. 13), the operator designates which color has been judged to need correction of its gray-scale characteristic and then presses a tone-correction start switch, whereupon the program proceeds to step S122. Here a 256-tone gray-scale test pattern image of the designated color is formed by the pattern generator 1029 of FIG. 13, and the pattern is printed out.

Figure 15:
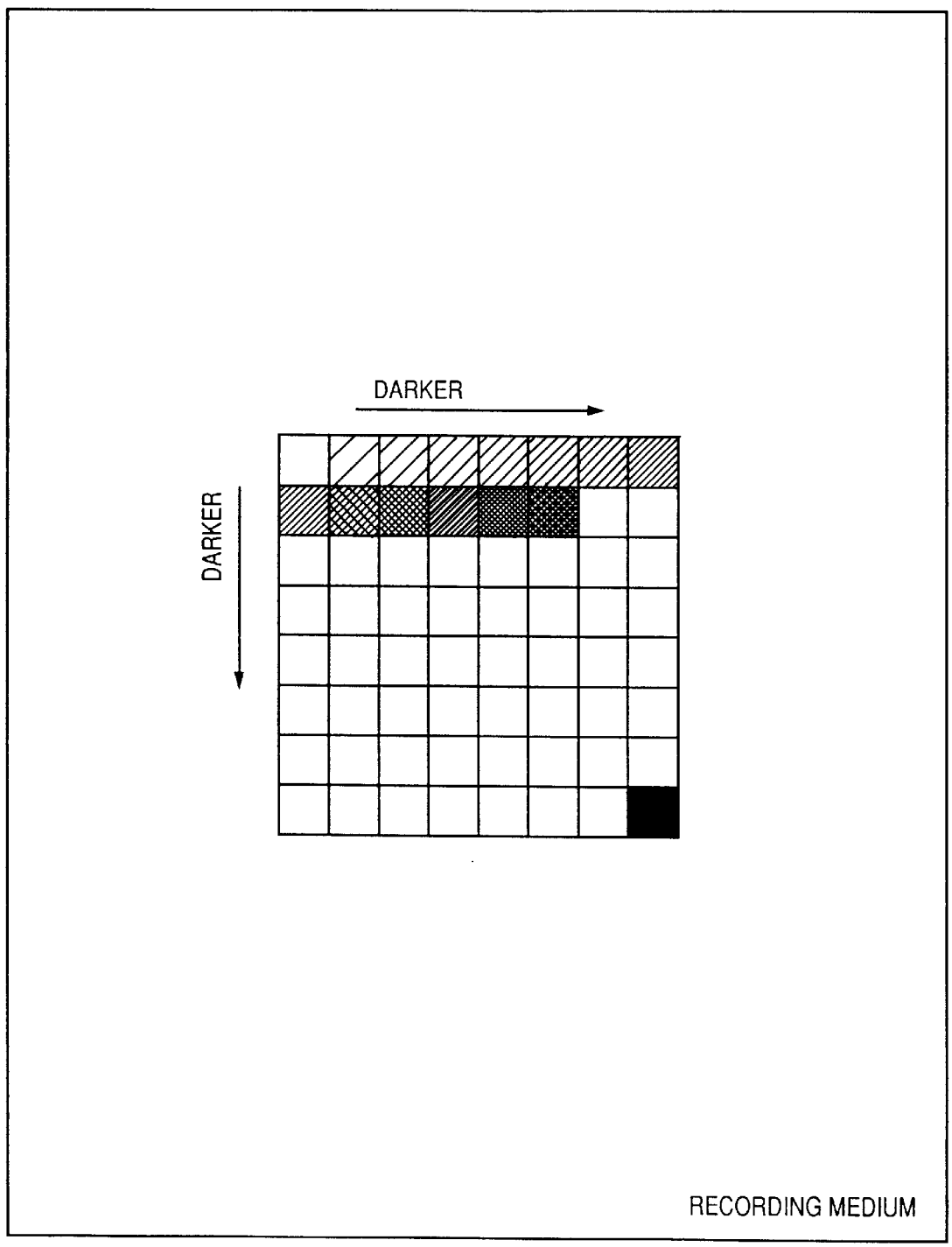
FIG. 15 is a diagram showing a gray-scale test-pattern output in the third embodiment of the invention.

FIG. 15 illustrates an example of the gray-scale test pattern outputted on the recording medium. The intensity of this gray-scale test pattern is lowest at the upper left and highest at the lower right. Intermediate these gray levels the intensity gradually rises from the upper left to the lower right. It should be noted that the intensities of some of the intermediate patches are not shown in FIG. 15.

Next, at step S123, the gray-scale test pattern outputted at step S122 is placed upon the platen 102 as the original 101 to be read, whereupon the sample is illuminated by the light source 103. The reflected light from the test pattern passes through the color-separating optical system 104 and is converted into a signal, which represents the amount of reflected light, by the CCD 105. This signal is LOG-converted by the LOG converter 1024 shown in FIG. 13, and the converted signal is read in by the CPU 1028 as intensity data.

This is followed by step S124, at which the CPU obtains, in correlation with the coordinates of each gray-scale test pattern, the relationship between the laser output level which prevails when the gray-scale test pattern is read and the intensity value of the read gray-scale test pattern. The relationship is stored in a memory 1032.

Next, at step S125, it is determined whether the relationship between the laser output level and the read intensity obtained at step S124 is abnormal or not.

Specifically, at step S125, a pattern having a low intensity in the gray-scale test pattern is compared with the pattern having the next lower intensity, this pattern is then compared with the pattern having the next lower intensity, and so forth. If the difference between the compared intensities lies outside predetermined limits (0~X, where X is a value set in the apparatus in advance), it is judged that the relationship between the laser output level and the read intensity is abnormal.

If it is judged at step S125 that the relationship between the laser output level and the read intensity is not abnormal, then the program proceeds to step S126, where the printer characteristic indicated in the third quadrant of FIG. 3 is obtained based upon the relationship between the laser output level and the read intensity obtained at step S124. The characteristic of the $\gamma$-LUT 1025 shown in the second quadrant is determined by interchanging the input/output relationship of the printer characteristic, and the $\gamma$-LUT 1025 for all 256 tones is set.

If it is judged at step S125 that the relationship between the laser output level and the read intensity is abnormal, then the program proceeds to step S127. Here a message such as "PLEASE CALL A SERVICEMAN" is displayed on a display unit 1031 (FIG. 13) to urge the user to call a serviceman. Processing is terminated without the $\gamma$-LUT 1025 being set.

The foregoing concludes the processing for setting the $\gamma$-LUT 1025 according to this embodiment.

If the message for calling the serviceman is displayed at step S127 in FIG. 14, the possibility that the apparatus is abnormal is high. After the cause of the abnormality is eliminated, gray-scale correction is performed again. In other words, processing starts from step S121.

In accordance with this embodiment as described above, any abnormality in the apparatus is sensed at the time of the gray-scale correction. This makes it possible to prevent erroneous operation.

<Fourth Embodiment>

In the third embodiment described above, the user is urged to call a serviceman if any abnormality occurs in the apparatus. The object of the fourth embodiment is to give notice also of the malfunctioning location.

The setting of the γ-LUT 1025 according to the fourth embodiment is indicated in FIG. 14 of the third embodiment and the processing need not be described again.

In the fourth embodiment, data such as the T/C ratio (toner-to-carrier ratio) also is referred to when it is judged at step S125 of FIG. 14 whether the relationship between the laser output level and the read intensity is abnormal or not. The method of obtaining the T/C ratio will be described with reference to FIG. 16.

Figure 16:
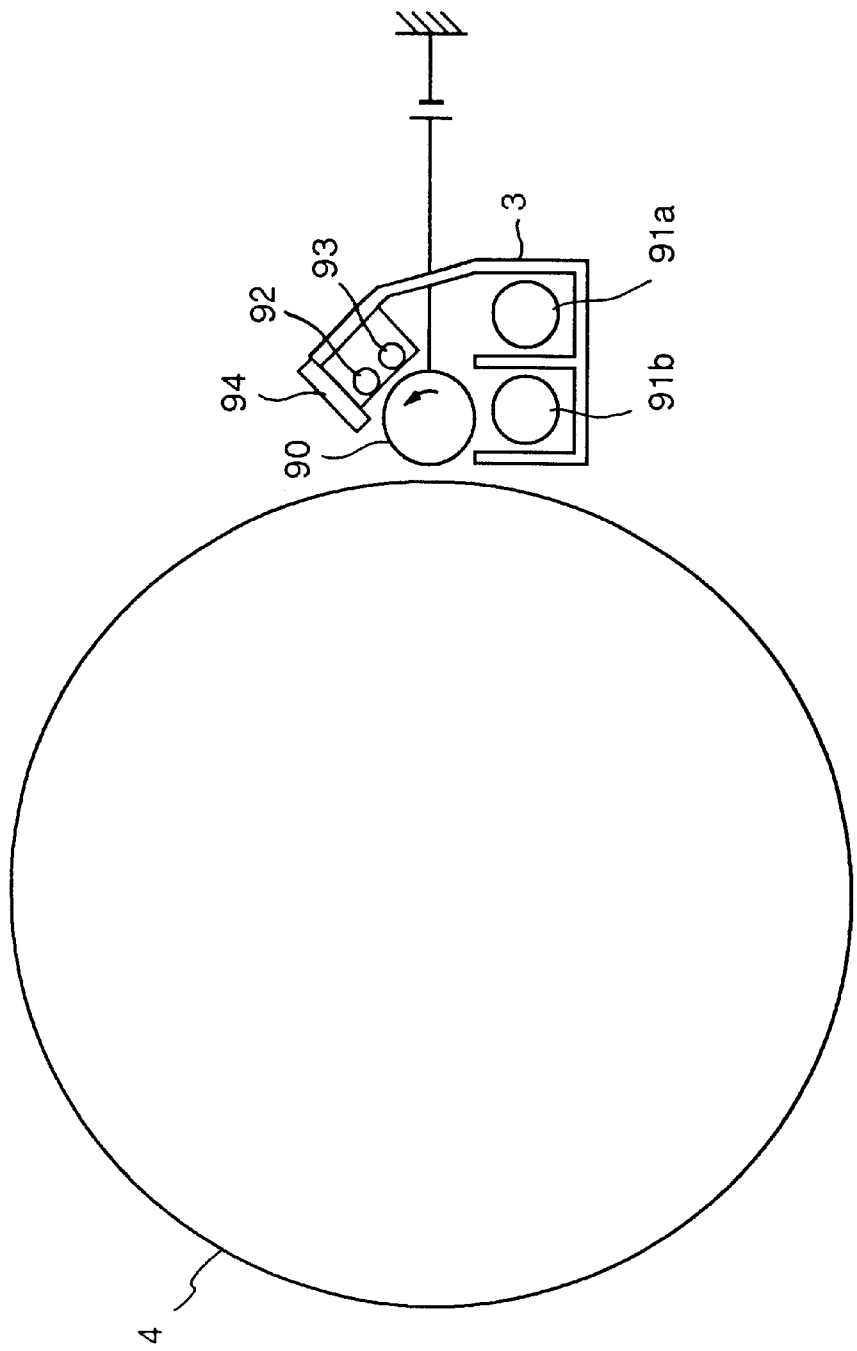
FIG. 16 is a diagram showing in detail the construction of a developer in the fourth embodiment of the invention.

FIG. 16 illustrates the details of the developing device 3 shown in FIG. 1. As shown in FIG. 16, toner is developed by the developing device 3 in such a manner that the latent image formed on the photosensitive drum 4 becomes visible. In this embodiment, use is made of a developing agent comprising two ingredients, namely carrier and toner.

Since image intensity is dependent upon toner density (T/C ratio) in the developing agent, the T/C ratio must be held constant.

The developing device 3 has screws 91*a*, 91*b* for stirring the developing agent uniformly. The screw 91*a* conveys the developing agent by being rotated into the page of FIG. 16, and the screw 91*b* conveys the developing agent by being rotated out of the page of FIG. 16. As a result, the developing agent is circulated inside the developing device 3.

Since the carrier contained in the developing agent is magnetic, the carrier and the toner are drawn upward in the mixed state by a magnet built in a developer sleeve 90 and are uniformly applied to the photosensitive drum 4 as a coating by a blade 94. Next, an amount of toner conforming to the difference between a voltage applied to the developer sleeve 90 and the potential of the latent image on the photosensitive drum 4 attaches itself to the photosensitive drum 4, whereby development is performed.

Further, the developing device 3 internally accommodates an optical sensor, which comprises an LED 92 and a photodiode 93. The optical sensor is pointed toward the developing agent that has been drawn up to the developer sleeve 90.

The LED 92 and photodiode 93 both peak at a wavelength of 950 nm, the toner used is one which reflects light in this wavelength region and the carrier used is one which absorbs light in this wavelength region. As a consequence, the T/C ratio is high if the output of the photodiode 93 is high and is low if the output of the photodiode 93 is low.

The output of the photodiode 93 at the set T/C ratio is stored in memory in advance. By comparing this stored output with the present output of the photodiode 93, the present T/C ratio can be detected from the difference between them.

In a case where the present T/C ratio is detected to be low, the developing device 3 is supplied with additional toner from a toner replenishing unit (not shown) in order to return the T/C ratio to the set value.

The T/C ratio obtained in the manner described above is referred to when it is judged at step S125 whether the relationship between the laser output level and the read intensity is abnormal or not.

If it is judged at step S125 that the relationship between the laser output level and the read intensity is abnormal, then the program proceeds to step S127, at which a message is displayed on the display unit 1031 shown in FIG. 13. At this time a message for estimating the location of the fault is displayed on the basis of the T/C ratio obtained by the optical sensor within the developing device 3.

Specific examples of messages through which the location of a fault may be estimated are described below.

Assume that read intensity can exhibit one of the three stages "high", "normal" and "low", and that the T/C ratio likewise can take on a "high", "normal" or "low" stage. Thus there are nine possible states, as shown in Table 1 below.

TABLE 1

| READER INTENSITY T/C RATIO | HIGH | NORMAL | LOW |
|---|---|---|---|
| HIGH | 1 | 2 | 3 |
| NORMAL | 4 | 5 | 6 |
| LOW | 7 | 8 | 9 |

Messages corresponding to respective ones of the states shown in Table 1 can be set as shown in Table 2 below.

TABLE 2

| STATES | MESSAGE |
|---|---|
| 1 | CONTINUE OUTPUT OF PICTURE UNTIL T/C RATIO FALLS |
| 2, 3, 6 | CHECK DEVELOPING DEVICE OR TRANSFER SYSTEM |
| 4, 7, 8 | CHECK DEVELOPING DEVICE |
| 5 | NORMAL |
| 9 | CHECK HOPPER |

In accordance with the fourth embodiment as described above, any abnormality such as an abnormality in the apparatus that occurs at the time of a gray-scale correction is sensed and the location of the fault is estimated, thereby making it possible to prevent erroneous operation and facilitate maintenance.

<Fifth Embodiment>

The third embodiment described above deals with discovery of an abnormality in the apparatus when a gray-scale correction is performed based on a single designated color. However, a gray-scale correction is necessary for all types of color toner used. Accordingly, the fifth embodiment deals with discovery of an abnormality in the apparatus when a gray-scale correction is performed simultaneously for all of the colors yellow, magenta, cyan and black.

The construction of the fifth embodiment is the same as that of FIGS. 1 and 13 described above.

The process through which the γ-LUT 1025 is set in the fifth embodiment will be described with reference to FIG. 17.

Figure 17:
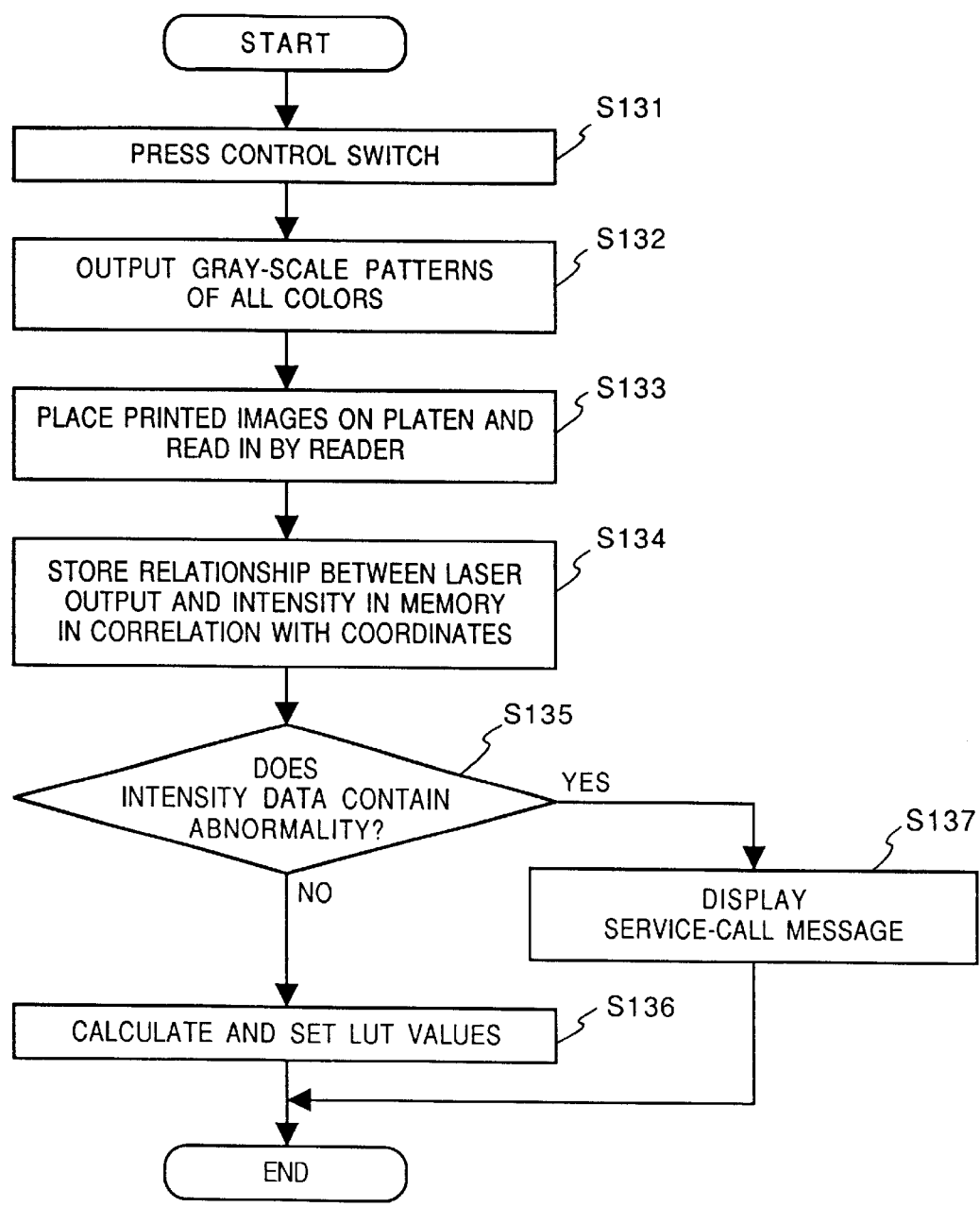
FIG. 17 is a flowchart illustrating processing for creating a gamma LUT in a fifth embodiment of the present invention.

First, at step S131 in FIG. 17, the operator presses the tone-correction start switch on the control panel, whereupon the program proceeds to step S132. Here 256-tone gray-scale test patterns of all colors are formed on the recording medium by the pattern generator 1029 of FIG. 13, and the pattern is printed out.

Figure 18:
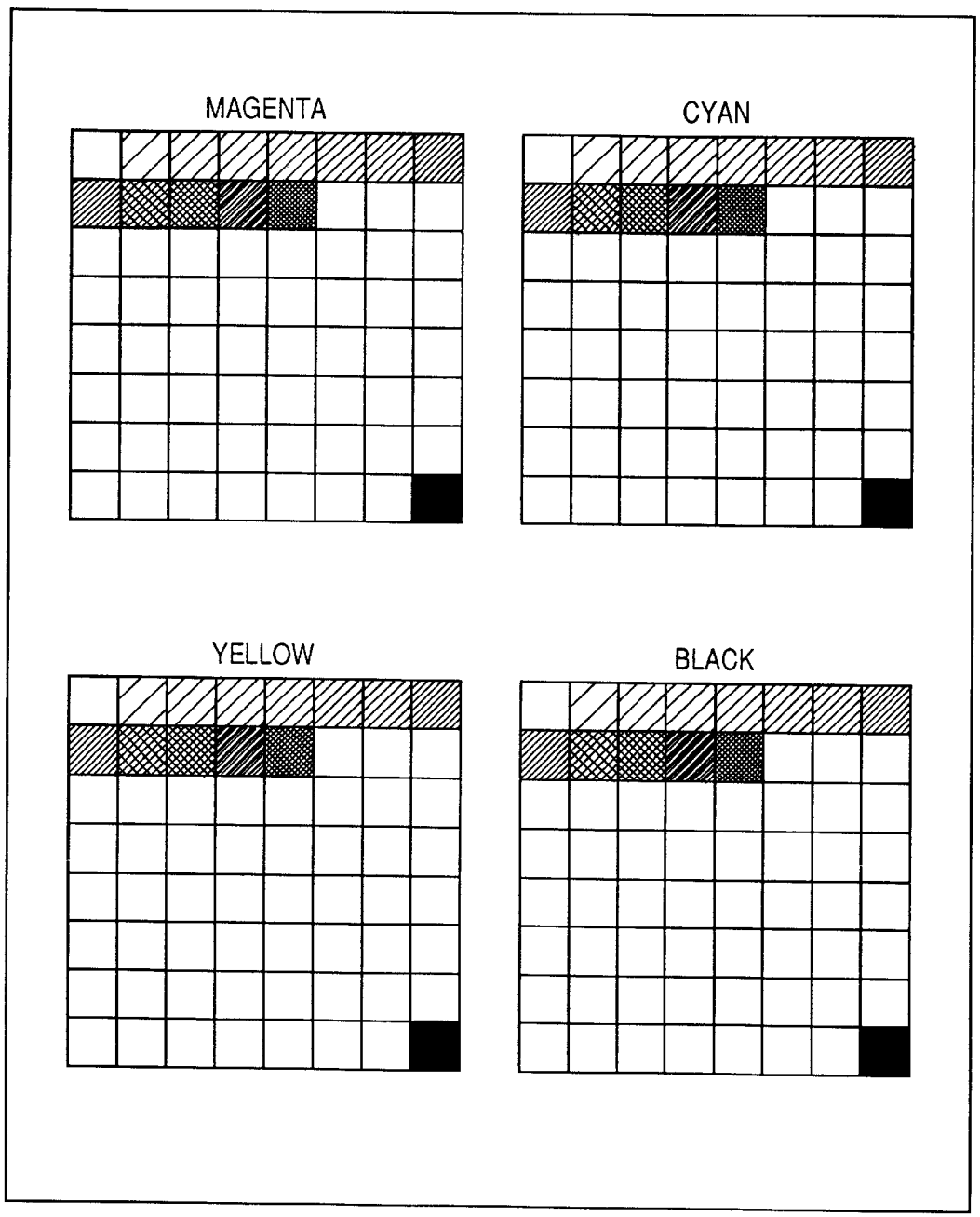
FIG. 18 is a diagram showing a gray-scale test-pattern output in the fifth embodiment of the invention.

FIG. 18 illustrates an example of the gray-scale test patterns of all colors outputted on the recording medium. As shown in FIG. 18, the intensity of each gray-scale test pattern is lowest at the upper left and highest at the lower right. Intermediate these gray levels the intensity gradually rises from the upper left to the lower right. It should be noted that the intensities of some of the intermediate patches are not shown in FIG. 18.

Next, at step S133, the gray-scale test patterns outputted at step S132 are placed upon the platen 102 as the original 101 to be read, whereupon the test patterns are illuminated by the light source 103. The reflected light from the test patterns passes through the color-separating optical system 104 and is converted into a signal, which represents the amount of reflected light, by the CCD 1021. This signal is LOG-converted by the LOG converter 1024 shown in FIG. 13, and the converted signal is read in by the CPU 1028 as intensity data.

This is followed by step S134, at which the CPU obtains, in correlation with the coordinates of each gray-scale test pattern, the relationship between the laser output level which prevails when the gray-scale test pattern is read and the intensity value of the read gray-scale test pattern. The relationship is stored in the memory 1032 of FIG. 13.

Next, at step S135, it is determined whether the relationship between the laser output level and the read intensity obtained at step S134 is abnormal or not.

Specifically, at step S135, a pattern having a low intensity in the gray-scale test pattern is compared with the pattern having the next lower intensity, this pattern is then compared with the pattern having the next lower intensity, and so forth. If the difference between the compared intensities lies outside predetermined limits (0~X, where X is a value set in the apparatus in advance), it is judged that the relationship between the laser output level and the read intensity is abnormal.

If it is judged at step S135 that the relationship between the laser output level and the read intensity is not abnormal, then the program proceeds to step S136, where the printer characteristic indicated in the third quadrant of FIG. 3 is obtained based upon the relationship between the laser output level and the read intensity obtained at step S134. The characteristic of the γ-LUT 1025 shown in the second quadrant is decided by interchanging the input/output relationship of the printer characteristic, and the γ-LUT 1025 for all 256 tones is set.

If it is judged at step S135 that the relationship between the laser output level and the read intensity is abnormal, then the program proceeds to step S137. Here a message such as "PLEASE CALL A SERVICEMAN" is displayed on the display unit 1031 to urge the user to call a serviceman. Processing is terminated without the γ-LUT 1025 being set.

The foregoing concludes the processing for setting the γ-LUT 1025 according to the fifth embodiment.

If the message for calling the serviceman is displayed at step S137 in FIG. 17, the possibility that the apparatus is abnormal is high. After the cause of the abnormality is eliminated, therefore, gray-scale correction is performed again. In other words, processing starts from step S131.

Thus, in accordance with the fifth embodiment as described above, effects similar to those of the third embodiment are obtained not for just a single color but for all colors.

<Sixth Embodiment>

Though a full-color digital copier is described in the third through fifth embodiments, the present invention naturally is not limited to the foregoing examples but is effective in a monochromatic digital copier as well.

In a sixth embodiment, an example is described in which the present invention is applied to a monochromatic digital copier.

Figure 19:
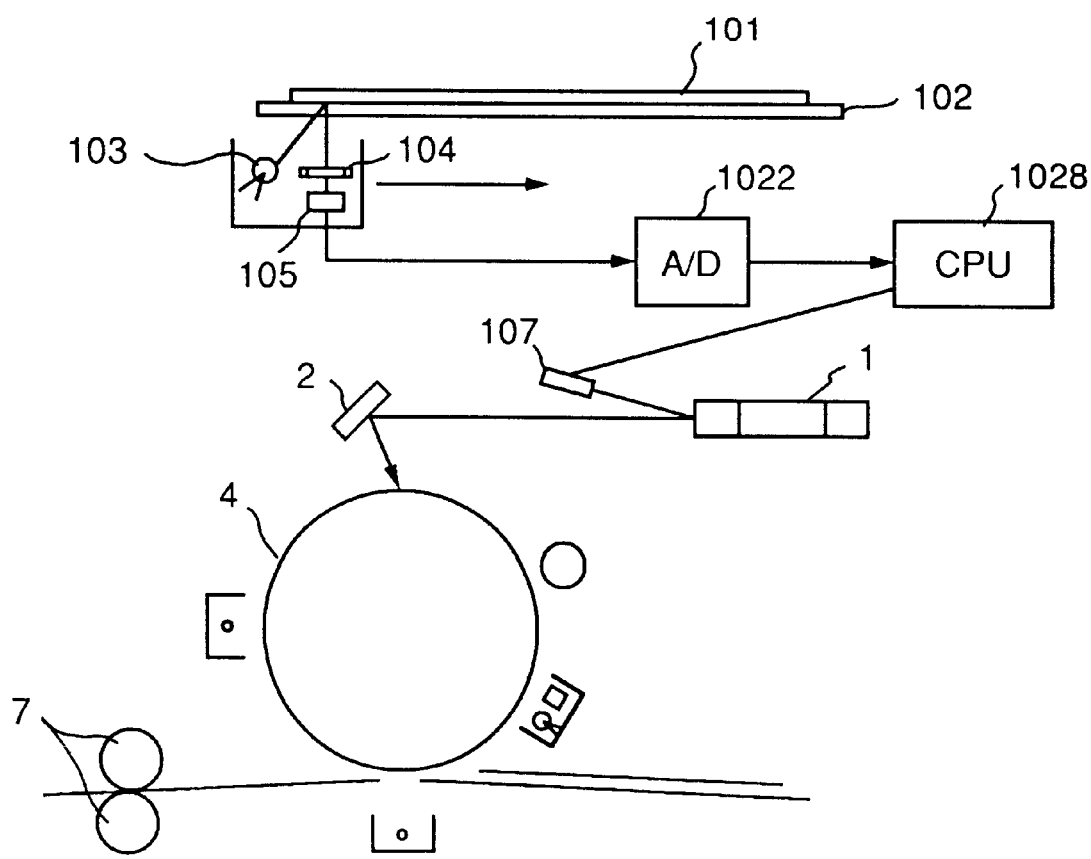
FIG. 19 is a diagram showing the essential elements of a sixth embodiment of the present invention.

FIG. 19 is a diagram illustrating the principal components of a monochromatic digital copier. Components identical with those shown in FIGS. 1 and 13 are designated by like reference characters and need not be described again.

In the sixth embodiment shown in FIG. 19, multiple transfer is not required since the copier is monochromatic. Accordingly, the chief difference between this arrangement and that of FIG. 1 is that a transfer drum is not provided.

The method of tone correction and the method of finding abnormalities in the apparatus according to this embodiment are the same as in the third embodiment.

In the sixth embodiment as described above, effects similar to those of the third embodiment are obtained with a monochromatic copier.

Though a laser-beam printer is described in the third through sixth embodiments, the invention is not limited to a laser-beam printer but is applicable also to an ink-jet printer or a dot-matrix printer.

In the present invention, a tone correction is carried out by resetting the values of a gamma look-up table, and various image forming conditions are controlled in accordance with the results of tone correction. The image forming conditions controlled include not only amount of laser light and laser emission time but also potential of the primary electrifying device and developing bias. In a case where the invention is applied to an ink-jet printer, image forming conditions include the distance between the ink-jet head and the recording medium. If the invention is applied to a dot-matrix printer, image forming conditions include the sublimation ink ribbon of the sublimation-type head.

The present invention can be applied to a system constituted by a plurality of devices or to an apparatus comprising a single device. Furthermore, it goes without saying that the invention is applicable also to a case where the object of the invention is attained by supplying a program to a system or apparatus.

In accordance with the embodiments described above, if an abnormal portion is found in an intensity value of a gray-scale test pattern when the pattern is read in, notification is given of the fact that some abnormality has developed, thereby making it possible to prevent erroneous operation by forgoing a gray-scale adjustment. Furthermore, maintenance is facilitated by estimating the location at which an abnormality has occurred.

As many apparently widely different embodiments of the present invention can be made without departing from the spirit and scope thereof, it is to be understood that the invention is not limited to the specific embodiments thereof except as defined in the appended claims.

What is claimed is:

1. An image forming apparatus, comprising:
    image forming means for forming an image corresponding to given data onto a recording medium;
    pattern generating means for generating gray-scale pattern data for tone correction which corresponds to a given gray-scale pattern constructed by plural patches, each of which has a density different from the other, and outputting the generated gray-scale pattern data to said image forming means to form a gray-scale pattern with marks onto the recording medium;
    reading means for reading the gray-scale pattern formed on the recording medium and generating reading data indicating each patch and marks; and
    controlling means for controlling an image forming condition of said image forming means on the basis of the reading data and positions of the plural patches depending on skew of the recording medium determined by positions of the marks.

2. The apparatus according to claim 1, which displays information communicating the skew of the recording medium.

3. The image forming apparatus according to claim 1, wherein said reading means includes a CCD for generating luminance data.

4. The image forming apparatus according to claim 1, wherein said controlling means includes correcting means for correcting a gray-scale characteristic of an image to be formed by said image forming means.

5. The image forming apparatus according to claim 1, wherein said image forming means includes means for performing a pulse-width-modulation process based on the image date generated by said reading means.

6. The image forming apparatus according to claim 1, wherein said control means controls the image forming condition for each color component.

7. An image forming method, comprising the steps of
generating gray-scale pattern data for tone correction which corresponds to a given standard gray-scale pattern constructed by plural patches, each of which has a density different from the other,
forming the gray-scale pattern with marks onto a recording medium;
reading, by a reading unit, the gray-scale pattern formed on the recording medium and generating reading data indicating each patch and marks;
controlling an image forming condition on the basis of the reading data and positions of the patches depending on skew of the recording medium determined by positions of the marks; and
forming an image based upon the image forming condition.

8. The method according to claim 7, further comprising a step of displaying information that the recording medium is skewed.

9. An image forming apparatus comprising:
image forming means for forming an image on a recording medium;
pattern forming means for forming a gray-scale pattern on a recording medium for tone correction and constructed by plural patches, each of which has a density different from the other,
reading means for reading the gray-scale pattern formed on the recording medium and generating reading data corresponding to the density of each patch read;
controlling means for controlling an image forming condition on the basis of the reading data; and
discriminating means for discriminating whether the reading data is suitable for use by said controlling means.

10. The apparatus according to claim 9, wherein the image forming condition is controlled by setting a look-up table which performs a gamma correction.

11. The apparatus according to claim 9, further comprising:
fault-location estimating means for estimating location of the abnormality based upon at least one image forming parameter.

12. The image forming apparatus according to claim 9, wherein said reading means includes a CCD for generating luminance data.

13. The image forming apparatus according to claim 9, wherein said image forming means includes correcting means for correcting a gray-scale characteristic of the image data generated by said reading means.

14. The image forming apparatus according to claim 9, wherein said image forming means includes means for performing a pulse-width-modulation process based on the image data generated by said reading means.

15. The image forming apparatus according to claim 9, wherein said control means controls the image forming condition for each color component.

16. An image forming method comprising the steps of
forming a gray-scale pattern on a recording medium for tone correction and constructed by plural patches, each of which has a density different from the other;
reading the gray-scale pattern formed on the recording medium pattern forming step;
generating reading data corresponding to the density of each patch read;
controlling an image forming condition on the basis of the reading data;
discriminating whether the reading data is suitable for use irk the controlling step, and
forming an image on a recording medium based upon the image forming condition.

17. An image forming apparatus comprising:
reading means for reading an image formed on a medium and generating image data corresponding to the read image,
pattern generating means for generating pattern data representing a gray-scale pattern, said pattern data comprising plural patches, each having a density different from the other, and a standard mark;
image forming means for forming an image on a recording medium in accordance with the image data or the pattern data; and
controlling means for controlling an image forming condition of said image forming means based on the image data formed on the recording medium,
wherein said controlling means includes discriminating means for discriminating a position of the standard mark formed an the recording medium and correcting means for correcting the image data for positional deviation of the plural patches in the reading, based on the discriminated position of the standard mark.

18. The apparatus according claim 17, wherein said controlling means detects the gray-scale pattern based on the discrimination of said discriminating means.

19. The apparatus according to claim 17, wherein said reading means includes a platen for supporting the medium on which an image is formed.

20. The image forming apparatus according to claim 17, wherein said reading means includes a CCD for generating luminance data.

21. The image forming apparatus according to claim 17, wherein said controlling means includes correcting means for correcting a gray-scale characteristic of an image to be formed by said image forming means.

22. The image forming apparatus according to claim 17, wherein said image forming means includes means for performing a pulse-width-modulation process based on the image data generated by said reading means.

23. The image forming apparatus according to claim 17, wherein said control means controls the image forming condition for each color component.

24. An image forming method comprising the steps of:
reading an image formed on a medium and generating image data corresponding to the read image;
generating pattern data representing a gray-scale pattern, comprising plural patches, each having a density different from the other, and a standard mark;

forming an image on a recording medium in accordance with the image data or the pattern data; and controlling an image forming condition comprising discriminating a position of the standard mark formed on the recording medium based an the image data, and correcting the image data to correct positional deviation of the plural patches in the reading, based on the discriminated position of the standard marks.

* * * * *

UNITED STATES PATENT AND TRADEMARK OFFICE
CERTIFICATE OF CORRECTION

PATENT NO. : 6,515,769 B1
DATED : February 4, 2003
INVENTOR(S) : Yuichi Ikeda et al.

It is certified that error appears in the above-identified patent and that said Letters Patent is hereby corrected as shown below:

Title page,
Item [57], ABSTRACT,
Line 5, "one one" should read -- one --.

Column 1,
Line 10, "image" should read -- image on --.

Column 7,
Line 52, "a 4" should read -- a --.

Column 13,
Line 7, "date" should read -- data --;
Line 12, "of" should read -- of: --;
Line 16, "other," should read -- other; --; and
Line 37, "other," should read -- other; --.

Column 14,
Line 1, "of" should read -- of: --;
Line 14, "irk" should read -- in --; and "step," should read -- step; --;
Line 21, "image," should read -- image; --; and
Line 36, "an" should read -- on --.

Column 15,
Line 5, "an" should read -- on --.

Signed and Sealed this

Twenty-eighth Day of October, 2003

JAMES E. ROGAN
*Director of the United States Patent and Trademark Office*